United States Patent
Nishizawa

(10) Patent No.: US 11,331,677 B2
(45) Date of Patent: May 17, 2022

(54) MAGNET SEPARATOR

(71) Applicant: SUMITOMO HEAVY INDUSTRIES FINETECH, LTD., Okayama (JP)

(72) Inventor: Shinya Nishizawa, Okayama (JP)

(73) Assignee: SUMITOMO HEAVY INDUSTRIES FINETECH, LTD., Okayama (JP)

( * ) Notice: Subject to any disclaimer, the term of this patent is extended or adjusted under 35 U.S.C. 154(b) by 95 days.

(21) Appl. No.: 16/787,878

(22) Filed: Feb. 11, 2020

(65) Prior Publication Data

US 2020/0171511 A1     Jun. 4, 2020

Related U.S. Application Data

(63) Continuation of application No. PCT/JP2018/027295, filed on Jul. 20, 2018.

(30) Foreign Application Priority Data

Sep. 27, 2017   (JP) .............................. JP2017-186594

(51) Int. Cl.
| | |
|---|---|
| *B03C 1/247* | (2006.01) |
| *B03C 1/14* | (2006.01) |
| *B23Q 11/00* | (2006.01) |
| *B23Q 11/10* | (2006.01) |

(52) U.S. Cl.
CPC ............... *B03C 1/247* (2013.01); *B03C 1/14* (2013.01); *B03C 2201/18* (2013.01); *B03C 2201/28* (2013.01); *B23Q 11/0064* (2013.01); *B23Q 11/10* (2013.01)

(58) Field of Classification Search
CPC ................................................ Y10T 74/1993
See application file for complete search history.

(56) References Cited

U.S. PATENT DOCUMENTS

| | | | |
|---|---|---|---|
| 3,438,495 A | 4/1969 | Turnock | |
| 5,279,173 A | 1/1994 | Blaszynski et al. | |
| 5,638,959 A * | 6/1997 | Sommer, Jr. .......... | B07B 13/003 209/44.1 |
| 9,023,200 B2 | 5/2015 | Nishizawa | |
| 2015/0298138 A1 | 10/2015 | Vareika et al. | |

FOREIGN PATENT DOCUMENTS

| | | |
|---|---|---|
| EP | 2 656 920 A1 | 10/2013 |
| EP | 2 662 184 A1 | 11/2013 |
| JP | H07-136894 A | 5/1995 |
| JP | 2000-176215 A | 6/2000 |
| JP | 2001-008542 A | 1/2001 |
| JP | 2009-166004 A | 7/2009 |
| JP | 2009-208169 A | 9/2009 |
| JP | 2013-184241 A | 9/2013 |

OTHER PUBLICATIONS

International Search Report issued in Application No. PCT/JP2018/027295, dated Sep. 25, 2018.
Search Report issued in European Application No. 18863280.6, dated Oct. 1, 2020.

* cited by examiner

*Primary Examiner* — David C Mellon
(74) *Attorney, Agent, or Firm* — Michael Best & Friedrich LLP

(57) ABSTRACT

There is provided a magnet separator that removes a magnetic body from a liquid to be treated, the magnet separator including a rotary drum in which a plurality of magnets are disposed, and a sprocket that is fixed to the rotary drum and transmits a driving force, in which the sprocket is formed by a plurality of sprocket split bodies having sprocket teeth.

11 Claims, 8 Drawing Sheets

MAGNET SEPARATOR

RELATED APPLICATIONS

The contents of Japanese Patent Application No. 2017-186594, and of International Patent Application No. PCT/JP2018/027295, on the basis of each of which priority benefits are claimed in an accompanying application data sheet, are in their entirety incorporated herein by reference.

BACKGROUND

Technical Field

Certain embodiments of the present invention relate to a magnet separator for collecting a magnetic body such as a metal component included in a liquid to be treated. More specifically, the present invention relates to a magnet separator including a rotary drum in which a plurality of magnets are disposed and a sprocket fixed to the rotary drum.

Description of Related Art

There is a processing machine, of which a material to be cut is a magnetic metal, as a metalworking machine, and cutting oil containing cutting waste is exhausted from such a metalworking machine. As a cutting waste processing device for separating cutting waste out from such cutting oil, a magnet separator is known. The magnet separator includes a rotary drum, in which a magnet is disposed on an outer periphery thereof, and separates cutting waste out from cutting oil as the rotary drum adsorbs the cutting waste.

For example, a rotary drum magnetic separation apparatus that includes a rotary drum, in which a plurality of magnets are disposed, and separates out unnecessary substances (magnetic sludge) in a used coolant liquid is disclosed in the related art. A driving sprocket that transmits the rotation of a motor and a driven sprocket are fixed to both end parts of the rotary drum.

SUMMARY

According to an embodiment of the present invention, there is provided a magnet separator that removes a magnetic body from a liquid to be treated. The magnet separator includes a rotary drum in which a plurality of magnets are disposed and a sprocket that is fixed to the rotary drum and transmits a driving force. The sprocket is formed by a plurality of sprocket split bodies having sprocket teeth.

Since the sprocket is formed by the plurality of sprocket split bodies in the magnet separator, removing and attaching is possible for each sprocket split body. For this reason, the sprocket can be easily replaced in a state where the rotary drum is mounted on the main body. In a case where it is not necessary to replace the whole sprocket, such as a case where some of the sprocket teeth are missing, only a missing part of the sprocket split body can be replaced.

BRIEF DESCRIPTION OF THE DRAWINGS

FIG. 3A is a schematic explanatory view illustrating the mounting operation of the rotary drum. FIG. 3B is a schematic explanatory view illustrating the internal structure of the rotary drum.

DETAILED DESCRIPTION

Figure 1:
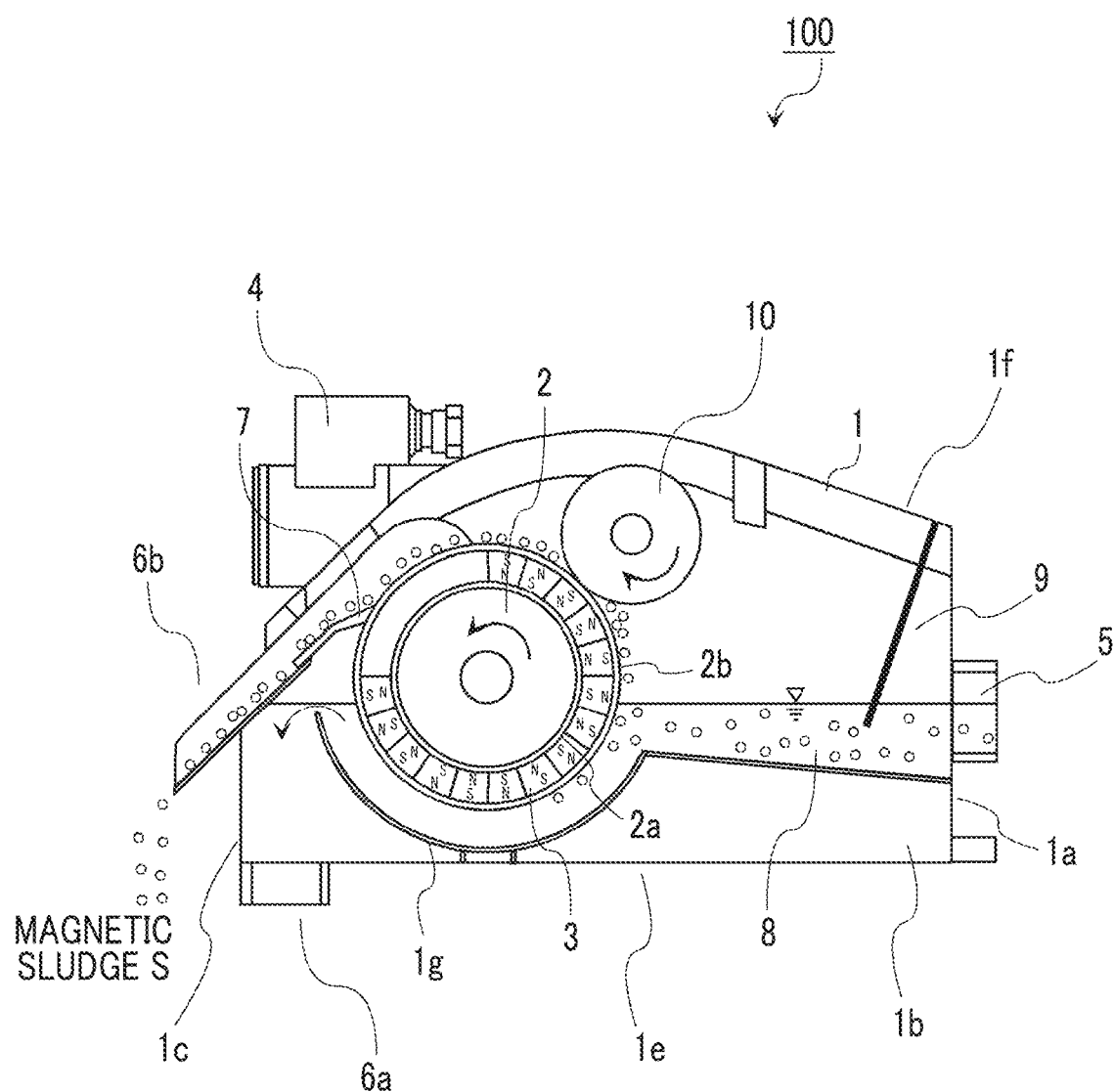
FIG. 1 is a schematic explanatory view illustrating a structure of a magnet separator according to one embodiment of the present invention.

It is necessary to periodically replace sprockets fixed to a rotary drum since the sprockets abrade due to meshing with chain. In the related art, the replacement of the sprocket is performing work of lifting the rotary drum to remove from a main body and pulling the sprocket out in a state where both ends of a shaft of the rotary drum are released. However, the work of lifting the rotary drum has poor workability since the work requires a crane device. In addition, it is difficult to handle a rotary drum having a high magnetic force, and thereby careful lifting work is required.

It is desirable to simplify sprocket replacement work in a magnet separator including a rotary drum in which a plurality of magnets are disposed and a sprocket fixed to the rotary drum.

As a result of thorough examination on the task, the present inventor has completed the present invention by finding out the following. In a magnet separator including a rotary drum in which a plurality of magnets are disposed and a sprocket that is fixed to the rotary drum and transmits a driving force, the sprocket can be replaced in a state where the rotary drum is mounted on a main body by configuring the sprocket with a plurality of sprocket split bodies having sprocket teeth.

That is, the present invention is the following magnet separator.

In the embodiment of the magnet separator of the present invention, the sprocket split bodies may be formed of a non-magnetic body.

According to this aspect, an effect, in which the sprocket split bodies are prevented from being pulled and attached to the magnets on a surface of the rotary drum when removing the sprocket split bodies, is achieved.

In the embodiment of the magnet separator of the present invention, a main body that accommodates the rotary drum may be further included, and the main body may include a window for removing or attaching a fixing member that fixes the sprocket split bodies to the rotary drum.

According to this aspect, the fixing member can be removed or attached from an outer side of the main body via the window provided in the main body. In addition, since it is not necessary to provide a work space for removing or attaching the fixing member between the main body and the rotary drum, it is possible to narrow a space between the main body and the rotary drum, and the main body can be miniaturized.

In the embodiment of the magnet separator of the present invention, the window may be positioned above a liquid surface of the liquid to be treated when operation of the magnet separator stops.

According to this aspect, when performing removing or attaching operation of the sprocket, it is not necessary to drain the liquid to be treated, and the sprocket can be replaced with simple work. In addition, since there is no leakage of the liquid to be treated from the window, a simple plug that is easily attached or removed can be used as a sealing member.

In the embodiment of the magnet separator of the present invention, the sprocket may be fixed to each of one end side and the other side of the rotary drum, and the window may be formed in each of both side walls of the main body. When the fixing member on the one end side of the rotary drum and the window formed in one side wall of the main body are at the same position, the fixing member on the other side of the rotary drum and the window formed in the other side wall of the main body may be at the same position.

According to this aspect, removing or attaching operation of the sprocket split bodies on one end side and the other end side of the rotary drum can be simultaneously performed from the outer side of both side walls.

In the embodiment of the magnet separator of the present invention, the sprocket may be fixed to each of one end side and the other end side of the rotary drum, and a fixing member of the sprocket on the one end side and a fixing member of the sprocket on the other end side may be attached to be at the substantially same position when seen from a rotation axis direction of the rotary drum.

A pedestal for supporting the rotary drum is formed on a main body inner wall. When the space between the main body and the rotary drum is narrowed, a positional relationship where the fixing member comes into contact with the pedestal is caused. For this reason, when introducing the rotary drum to the main body, it is necessary to introduce with the fixing member is away from the pedestal. As the fixing member of the sprocket on one end side of the rotary drum and the fixing member of the sprocket on the other end side are attached to be at the substantially same position when seen from the rotation axis direction of the rotary drum, regions where the fixing members are away from the pedestals match each other at both ends of the rotary drum. Therefore, there is an effect that rotary drum mounting work becomes easy.

The magnet separator of the present invention collects, for example, a magnetic body such as magnetic sludge included in a liquid to be treated by means of a magnetic force. The liquid to be treated is not particularly limited insofar as the liquid includes a magnetic body. The liquid to be treated may be an oily liquid, or may be a water-soluble liquid. Examples of a general liquid to be treated include a coolant liquid for a metal polishing machine of which a work material is a magnetic metal and a plating liquid for a device that executes plating on a steel plate. The magnet separator of the present invention can clean the liquid to be treated by collecting a magnetic body from the liquid to be treated. In addition, the magnet separator of the present invention can also be used, for example, in collecting a trace metal from industrial waste and removing foreign matters from beverages or cooking oil.

One Embodiment

Hereinafter, embodiments of the invention will be described in detail with reference to the accompanying drawings.

FIG. 1 illustrates a structure of a magnet separator 100 according to one embodiment of the present invention. The magnet separator 100 of the present invention includes a main body 1 formed by a rectangular casing, an input part 5 through which a liquid to be treated including magnetic sludge (magnetic body) is put into the main body 1, a treatment liquid discharge part 6a through which a treatment liquid, from which magnetic sludge is removed, is exhausted, and a magnetic body discharge part 6b through which the magnetic sludge is exhausted.

The main body 1 is a rectangular casing configured by a front wall 1a, a left wall 1b, a back wall 1c, a right wall 1d (refer to FIGS. 3A and 3B), a lower surface 1e, and a top surface 1f. The input part 5 is provided in the front wall 1a of the main body 1. The treatment liquid discharge part 6a is provided in the lower surface 1e of the main body 1. The magnetic body discharge part 6b is provided in the back wall 1c of the main body 1. In addition, inside the main body 1, a bottom wall 1g is formed, and thus a liquid reservoir 8 that stores the liquid to be treated is formed. The liquid to be treated supplied by a pump or the like flows in from the input part 5, and is temporarily stored in the liquid reservoir 8. After then, the bottom wall 1g is overflowed with the liquid to be treated, and the liquid to be treated is exhausted from the treatment liquid discharge part 6a.

Inside the main body 1, a flow regulating wall 9 is mounted so as to be spaced apart from an inlet of the input part 5. The flow regulating wall 9 has an effect of increasing a flow speed below the flow regulating wall 9 by directing flow of the input liquid to be treated downward. Accordingly, an effect of suppressing accumulation of magnetic sludge near the input part 5 is achieved.

Inside the main body 1, a rotary drum 2 that magnetically attracts magnetic sludge to exhaust the liquid to be treated to the outside is mounted. The rotary drum 2 is substantially horizontally supported in a direction perpendicular to the flow of the liquid to be treated, and is mounted such that a substantially circular lower half thereof is immersed below a liquid surface of the liquid to be treated and a substantially circular upper half thereof is exposed from the liquid surface. In addition, the bottom wall 1g is mounted along a shape of the rotary drum 2, such that the liquid to be treated passes through between the rotary drum 2 and the bottom wall 1g.

The rotary drum 2 is configured by two cylindrical bodies, including an inner cylinder 2a and an outer cylinder 2b, and a plurality of magnets 3 fixed to an outer periphery of the inner cylinder 2a. The plurality of magnets 3 can apply a predetermined magnetic force to an outer peripheral surface of the outer cylinder 2b to magnetically attract magnetic sludge toward the outer peripheral surface of the outer cylinder 2b. The two cylindrical bodies are formed of a non-magnetic material such as stainless steel, and a magnetic force is not generated from the cylindrical bodies.

The inner cylinder 2a is mounted to be fixed, and a range where a magnetic force is applied to the outer peripheral surface of the outer cylinder 2b by disposition of the plurality of magnets 3 fixed to the outer periphery of the inner cylinder 2a can be set. The range where a magnetic force is applied to the outer peripheral surface of the outer cylinder 2b is designed as appropriate according to an outer diameter of the rotary drum 2 or a position of a scraper 7. In the magnet separator 100 of the one embodiment, a magnetic force is applied in a range of approximately ¾ of the outer peripheral surface of the outer cylinder 2b from a portion of the rotary drum 2 immersed in the liquid reservoir 8 to a top part. In addition, a magnet is not disposed and a magnetic force is not applied to the rest approximately ¼ of the outer peripheral surface of the outer cylinder 2b.

The outer cylinder 2b is coaxially mounted with the inner cylinder 2a, and rotates by a driving force of a motor 4. A rotating direction of the outer cylinder 2b is an opposite direction to the flow of the liquid to be treated passing below (counterclockwise when seen from the page of FIG. 1).

A roller 10 for squeezing a liquid out from magnetic sludge magnetically attracted to the rotary drum 2 and the scraper 7 for scraping the magnetic sludge, from which the liquid is squeezed out, from the rotary drum 2 are mounted close to the top part of the rotary drum 2.

The roller 10 has an elastic body such as rubber disposed on a surface thereof, and contacts the outer peripheral surface of the outer cylinder 2b of the rotary drum 2 at predetermined pressing. Although an elastic body, such as chloroprene (CR)-based rubber and nitrile (NBR)-based rubber, is mainstream as the elastic body disposed on the surface of the roller 10, for example, uncrosslinked polyurethane of which a main component is polyester polyol may be used.

The scraper 7 is mounted in a region where a magnetic force is not applied, and contacts against the outer peripheral surface of the outer cylinder 2b of the rotary drum 2.

Next, the workings of the rotary drum 2 will be described. Magnetic sludge is attached to the outer peripheral surface of the rotary drum 2 immersed in the liquid to be treated due to the application of a magnetic force. Herein, when the outer cylinder 2b of the rotary drum 2 is rotated, the magnetic sludge is magnetically attracted to the outer peripheral surface of the rotary drum 2, and is moved in the rotating direction of the outer cylinder 2b due to a frictional force between the outer peripheral surface of the outer cylinder 2b and the magnetic sludge. Then, as the magnetically attracted magnetic sludge passes through between the outer peripheral surface of the rotary drum 2 and the roller 10, a liquid in the magnetic sludge is squeezed out. Therefore, the magnetic sludge with a little liquid can be separated out and collected. Next, the magnetic sludge from which the liquid is squeezed out moves to a position where a magnetic force is not applied, and is scraped from the outer peripheral surface of the rotary drum 2 by the scraper 7. The scraped magnetic sludge S is exhausted from the magnetic body discharge part 6b.

Although the magnet separator including one rotary drum 2 is given as an example in the one embodiment, the magnet separator of the present invention may include a plurality of rotary drums. In addition, a plurality of magnets may be disposed on an inner side of the outer cylinder, and the magnets may be rotated.

Figure 2:
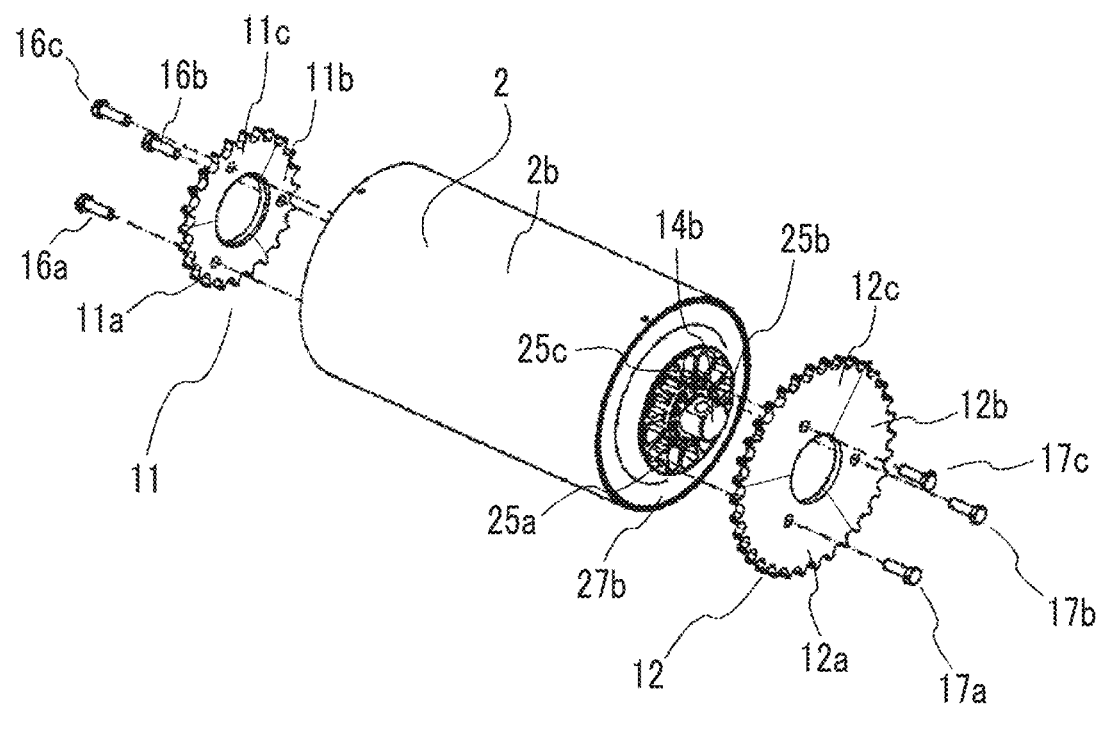
FIG. 2 is a schematic explanatory view illustrating structures of a rotary drum and a sprocket of the magnet separator according to the one embodiment of the present invention.
Figure 2:
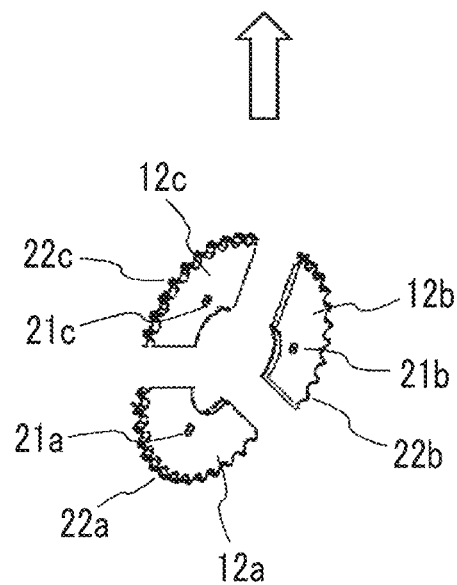

FIG. 2 illustrates structures of the rotary drum 2, a driving sprocket 11, and a driven sprocket 12. As illustrated in FIG. 2, the driving sprocket 11 and the driven sprocket 12 are attached to both ends of the outer cylinder 2b of the rotary drum 2. The driving sprocket 11 is connected to the motor 4, and transmits a driving force of the motor 4 to the rotary drum 2. The driven sprocket 12 is configured to be meshed with a sprocket of the roller 10, and transmits power of the motor 4 to the roller 10 via the rotary drum 2.

The sprocket used in the magnet separator of the present invention is formed of a plurality of sprocket split bodies having sprocket teeth. The sprocket split bodies configure a part of the sprocket, and the plurality of sprocket split bodies form one sprocket. For example, as illustrated in FIG. 2, the driving sprocket 11 and the driven sprocket 12 each are split into three parts, and are formed of a plurality of sprocket split bodies 11a, 11b, and 11c and a plurality of sprocket split bodies 12a, 12b, and 12c respectively. In addition, each of the sprocket split bodies is fixed to the rotary drum 2 by fixing members 16a, 16b, and 16c and fixing members 17a, 17b, and 17c respectively. Specifically, as exemplified by the driven sprocket 12, each sprocket split body is fixed to the rotary drum 2 by engaging the fixing members 17a, 17b, and 17c, each of which is formed of a screw, with screw holes 25a, 25b, and 25c formed in an end disk 27b of the rotary drum 2 via holes 21a, 21b, and 21c formed in the respective sprocket split bodies.

A shape of each sprocket split body is not particularly limited insofar as a function of one sprocket is fulfilled in combination with the plurality of sprocket split bodies. For example, not only a plurality of sprocket split bodies obtained by splitting one sprocket, but also sprocket split bodies that are formed independently of each other and fulfill a function of one sprocket when attached to the rotary drum may be used.

Although the number of sprocket split bodies configuring a sprocket is not particularly limited, the number is preferably four (split by 90°), more preferably three (split by 120°), and particularly preferably two (split by 180°) from a perspective of simplifying replacement work. In addition, it is preferable to finely split the sprocket from a perspective of replacing some of the missing teeth.

Although not particularly limited, a metal material, such as iron and stainless steel, is preferable as a material for the sprocket split body from a perspective of durability. In a case of applying to a rotary drum having a high magnetic force, a non-magnetic material that is unlikely to receive an effect of the magnetic force of the rotary drum (unlikely to be magnetized), such as stainless steel, is preferable in terms of easy handling. On the contrary, in a case of applying to a rotary drum having a low magnetic force, an effect of the magnetic force of the rotary drum is small. Therefore, it is preferable to use a magnetic material, such as iron which is affordable and excellent in versatility.

Insofar as the fixing members can attach the sprocket split bodies to end parts of the rotary drum 2, the fixing members may be any structures, for example, a screw and a pin.

Although not particularly limited, a non-magnetic material, such as stainless steel, and a magnetic material, such as iron, can be given as examples of a material for the fixing member just as the sprocket. In a case of using a non-magnetic material, a trouble in which the fixing members are pulled and magnetically attracted to the magnets 3 of the rotary drum 2 can be prevented. In addition, in a case of using a magnetic material, work of attaching and removing the fixing members can be easily performed by adsorbing the fixing members with a tool to which a magnet is attached.

Figure 3A:
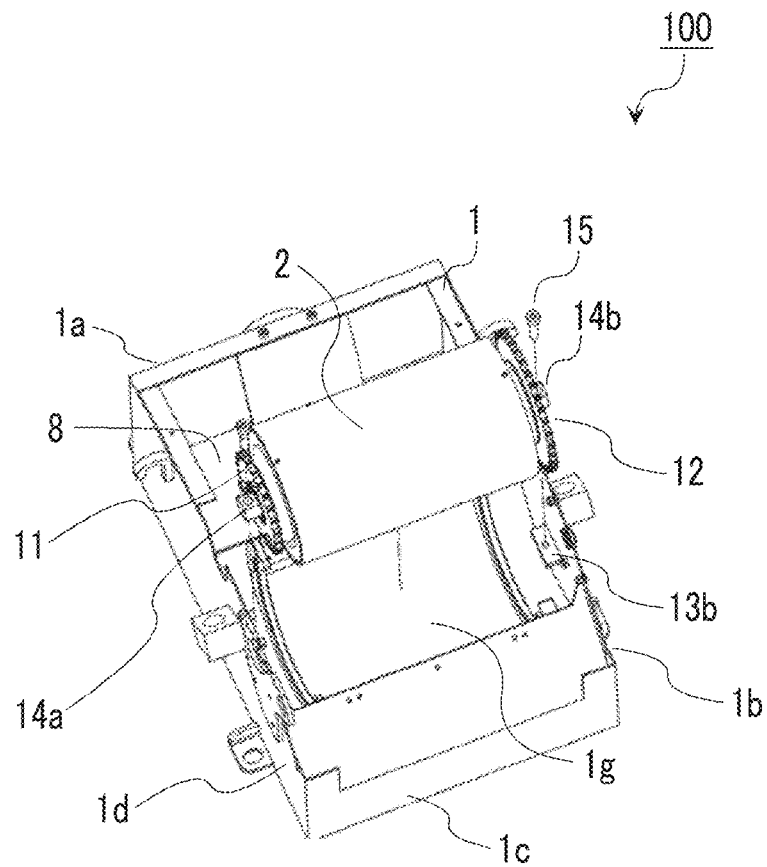
FIGS. 3A and 3B are schematic explanatory views illustrating mounting operation of the rotary drum and an internal structure of the rotary drum of the magnet separator according to the one embodiment of the present invention.
Figure 3B:
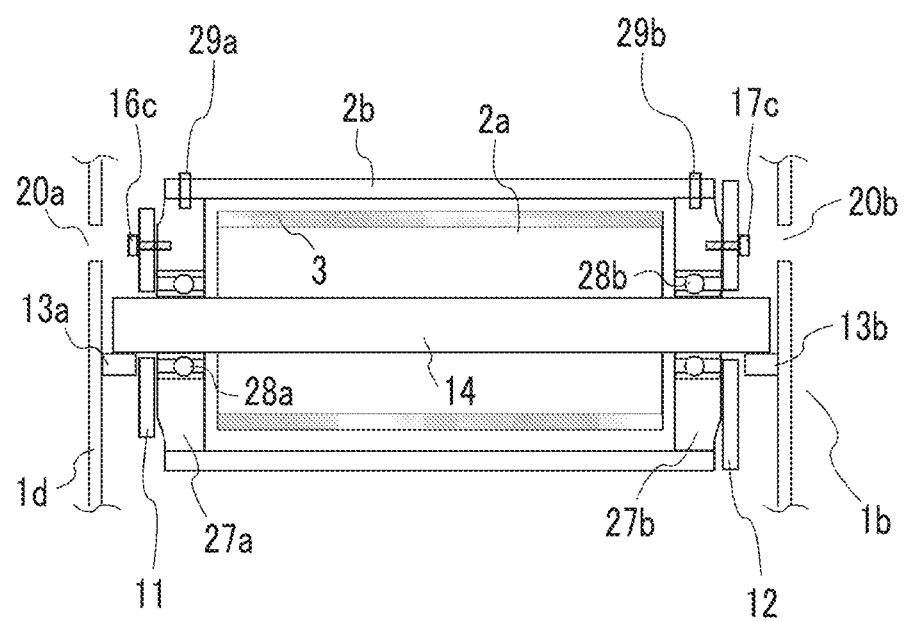

FIG. 3B is a schematic explanatory view illustrating an internal structure of the rotary drum 2. The rotary drum 2 includes a shaft 14 fixed to pedestals 13a and 13b of the main body, the inner cylinder 2a fixed to the shaft 14, the magnets 3 disposed in the vicinity of the inner cylinder 2a, and the outer cylinder 2b that stores the inner cylinder 2a therein. Ring-shaped end disks 27a and 27b are fixed to both end parts of the outer cylinder 2b by knock pins 29a and 29b. In the substantially centers of the end disks 27a and 27b, the shaft 14 is inserted via bearings 28a and 28b such as a ball bearing. In addition, the driving sprocket 11 and the driven sprocket 12 are attached to the end disks 27a and 27b by the fixing members.

Next, mounting operation of the rotary drum 2 will be described with reference to FIG. 3A. In mounting the rotary drum 2, the rotary drum 2 hangs by means of a crane and is introduced into the main body 1. A shaft end part 14a and a shaft end part 14b of the rotary drum 2 are placed on the pedestal 13a and the pedestal 13b, which are provided inside the main body 1, respectively, and the pedestal 13a, the pedestal 13b, the shaft end part 14a, and the shaft end part 14b are mounted by respectively being fixed to each other by shaft stoppers 15.

From a perspective of miniaturizing the main body 1, it is preferable to narrow spaces between both ends of the rotary drum 2 and the left wall 1b and the right wall 1d of the main body 1. In order to narrow the spaces, it is sufficient to shorten the shaft end part 14a and the shaft end part 14b and dispose the pedestal 13a, the pedestal 13b, the driving sprocket 11, and the driven sprocket 12 close to each other.

When the pedestal 13a, the pedestal 13b, the driving sprocket 11, and the driven sprocket 12 are disposed close to each other, the fixing members and the pedestals come into contact with each other in some cases according to fixing member (for example, screw heads) attached positions when the driving sprocket 11 and the driven sprocket 12 are rotated. For this reason, the fixing members 16a to 16c and the fixing members 17a to 17c are fixed to the end disk 27a and the end disk 27b at positions on a radially outer side of the pedestal 13a and the pedestal 13b such that the fixing members do not come into contact with the pedestal 13a and the pedestal 13b when the driving sprocket 11 and the driven sprocket 12 are rotated.

In addition, also when the rotary drum 2 is introduced to the main body 1, the fixing member attached positions are set such that the fixing members 16a to 16c and the fixing members 17a to 17c do not come into contact with the pedestal 13a and the pedestal 13b. That is, the end disk 27a (the outer cylinder 2b) is rotated, and positions of the fixing members 16a to 16c are adjusted such that the fixing members 16a to 16c do not come into contact with the pedestal 13a when the hanging rotary drum 2 is lowered and introduced to the main body 1. The fixing members 16a to 16c are adjusted to positions that do not come into contact with the pedestal 13a, and positions of the fixing members 17a to 17c are set such that also the fixing members 17a to 17c on the other end side do not come into contact with the pedestal 13b.

When the fixing member attached positions are designed from such a perspective, it is preferable that the fixing members 16a to 16c on one end side of the rotary drum 2 and the fixing members 17a to 17c on the other end side are attached at the substantially same position when seen from a rotation axis direction of the rotary drum 2 in a case where the sprockets are provided on both sides of the rotary drum 2. For example, as illustrated in FIG. 2, the fixing members are attached in the rotary drum 2 of the one embodiment such that the positions of the fixing member 16a and the fixing member 17a, the positions of the fixing member 16b and the fixing member 17b, and the positions of the fixing member 16c and the fixing member 17c are at the same positions when seen from the rotation axis direction of the rotary drum 2. Accordingly, when mounting the rotary drum 2 on the main body 1, contact between the pedestal 13a or the pedestal 13b, which supports a rotary shaft, and the fixing members 16a to 16c or the fixing members 17a to 17c is likely to be simultaneously avoided, and an effect that work of introducing the rotary drum 2 to the main body 1 becomes easy is achieved.

Another Embodiment

Figure 4:
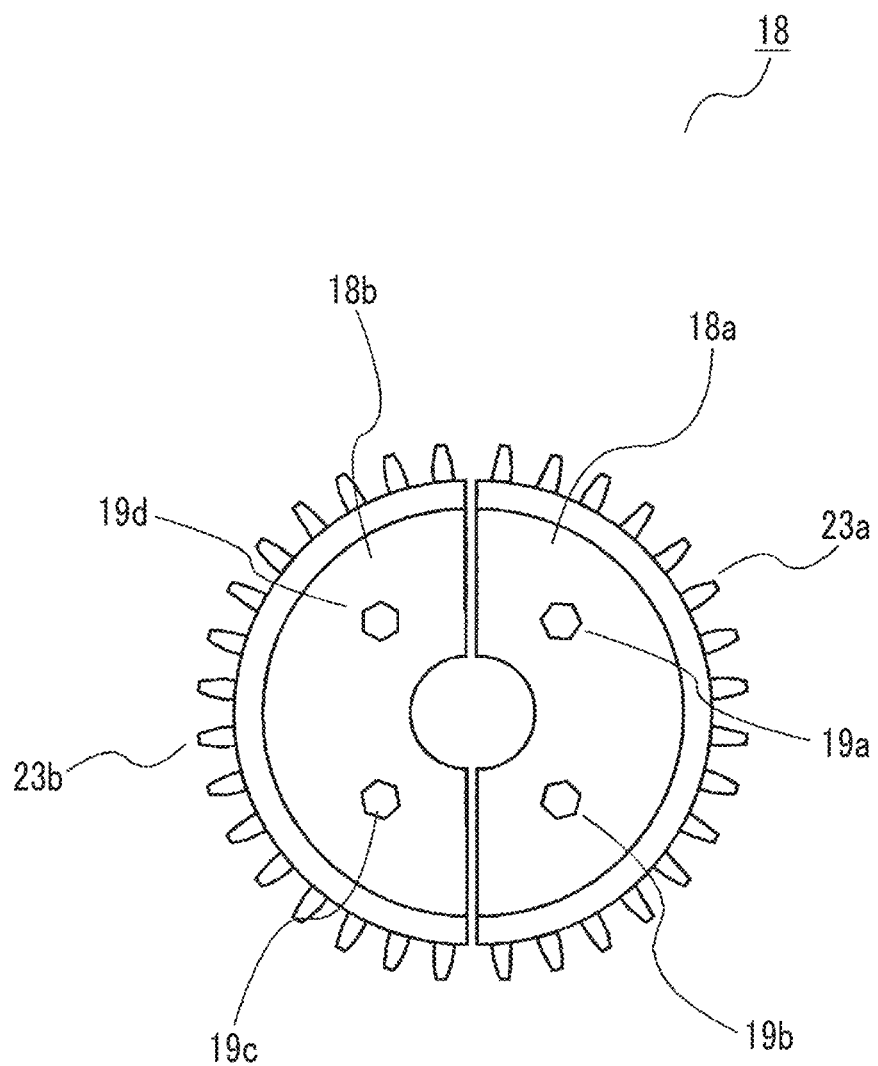
FIG. 4 is a schematic explanatory view illustrating a structure of a sprocket used in a magnet separator according to another embodiment of the present invention.

FIG. 4 illustrates another form of a sprocket used in the magnet separator of the present invention. A sprocket 18 is formed by semicircular sprocket split bodies 18a and 18b. Teeth 23a and 23b are formed on arc parts of the sprocket split bodies 18a and 18b respectively, and the sprocket split bodies form one sprocket by being integrated with each other.

Two fixing members 19a and 19b and two fixing members 19c and 19d are respectively attached to the sprocket split bodies 18a and 18b. When attaching the sprocket split bodies to the rotary drum as described above, it is preferable to attach with the use of two or more fixing members for one sprocket split body. Accordingly, the sprocket split bodies are firmly fixed to the rotary drum, and thereby a trouble in which a position of the sprocket is shifted due to power of the motor or the like can be prevented.

Figure 5:
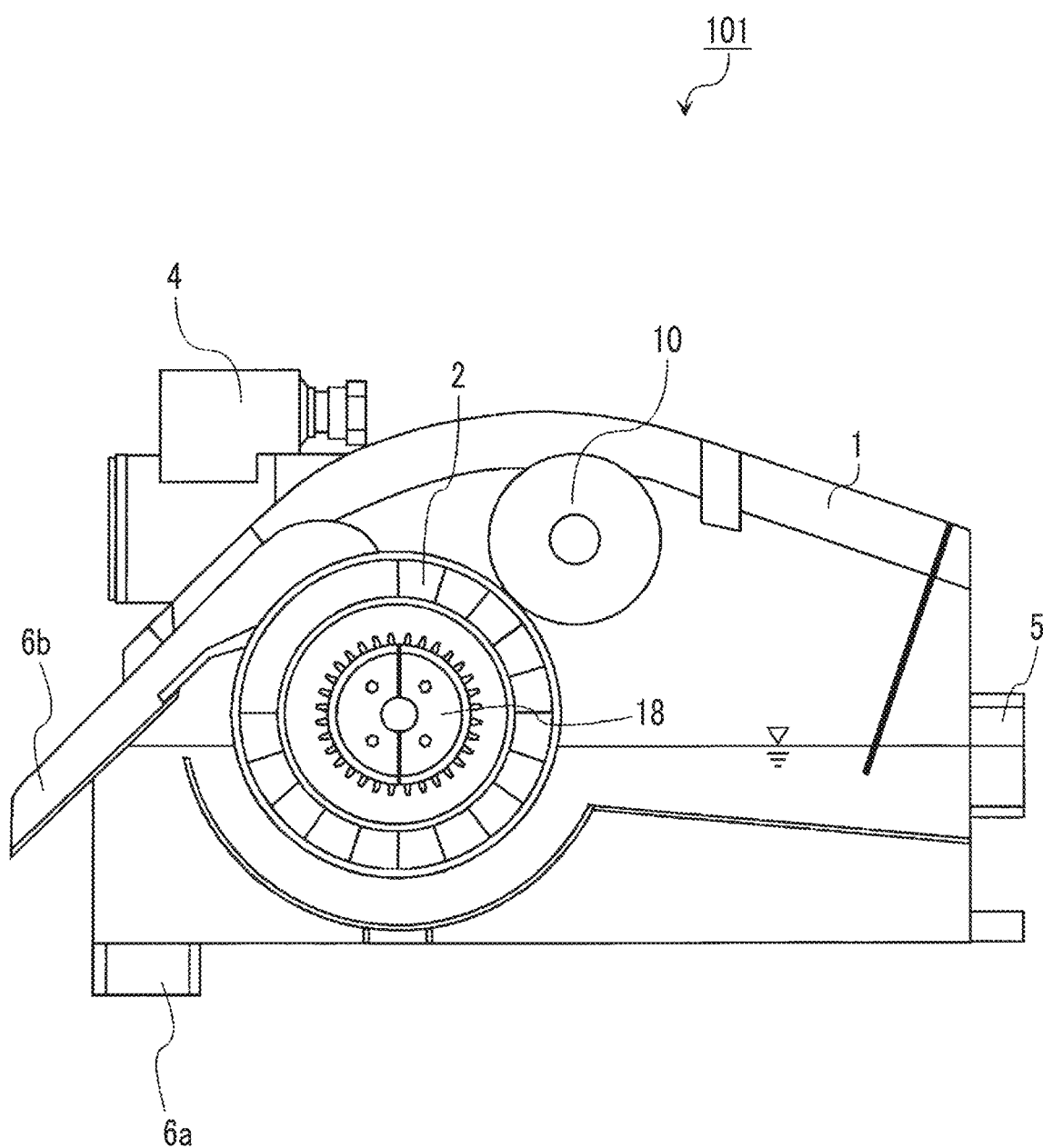
FIG. 5 is a schematic explanatory view illustrating a structure of the magnet separator according to another embodiment of the present invention.
Figure 6:
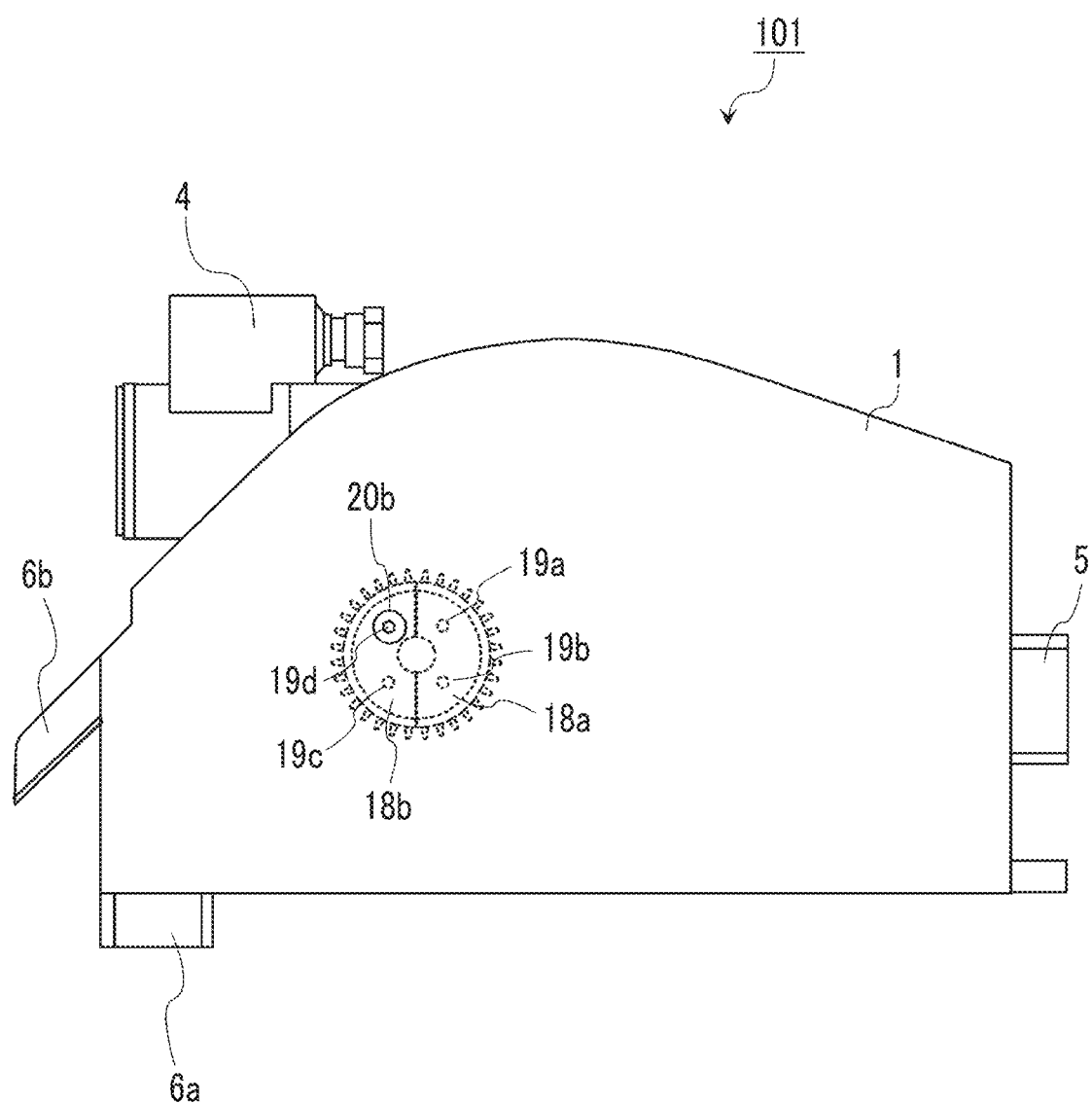
FIG. 6 is a schematic explanatory view illustrating removing operation of the sprocket of the magnet separator according to another embodiment of the present invention.
Figure 7:
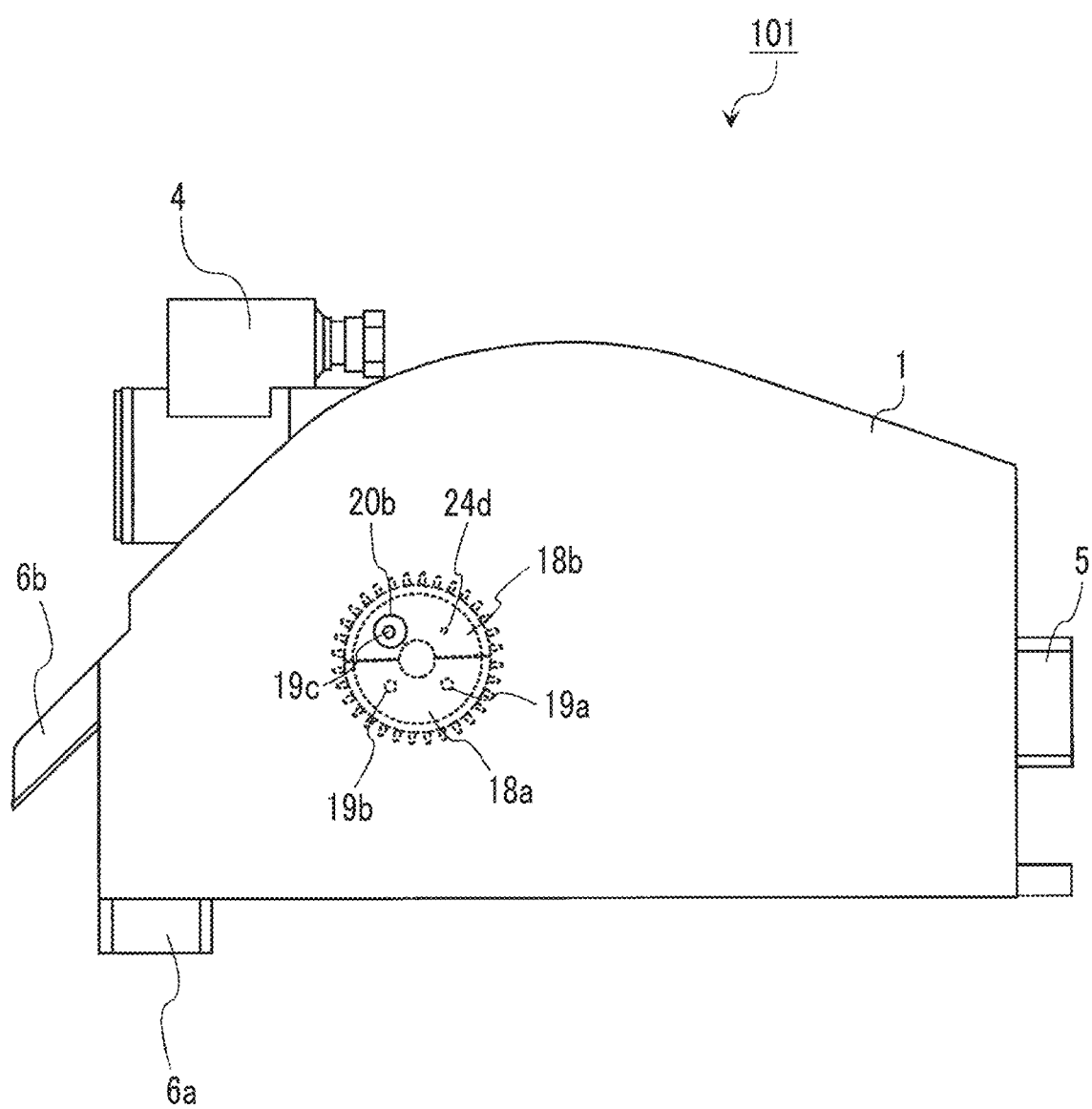
FIG. 7 is a schematic explanatory view illustrating the removing operation of the sprocket of the magnet separator according to another embodiment of the present invention.
Figure 8:
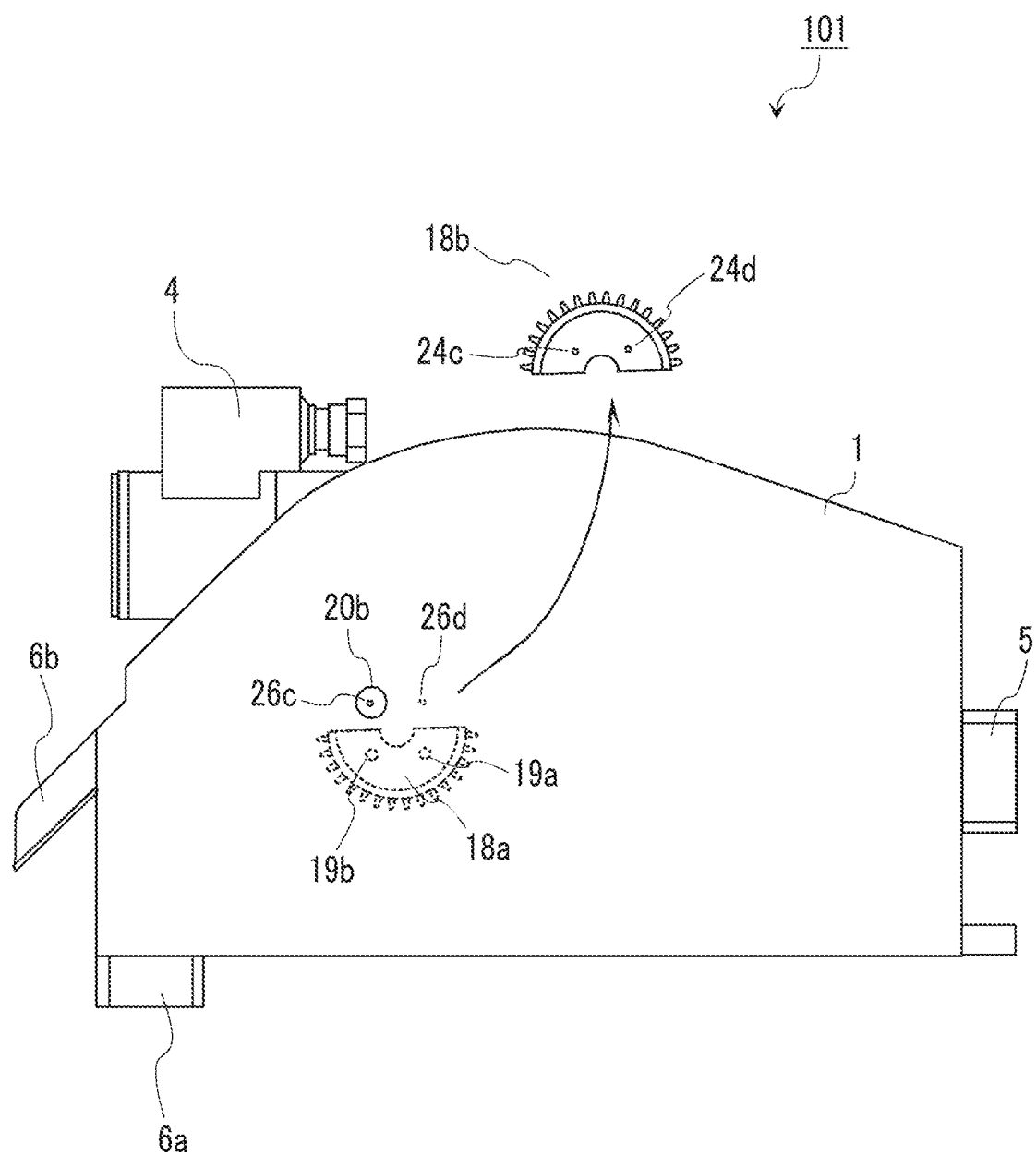
FIG. 8 is a schematic explanatory view illustrating the removing operation of the sprocket of the magnet separator according to another embodiment of the present invention.

FIG. 5 illustrates a structure of a magnet separator 101 according to another embodiment of the present invention. FIGS. 6 to 8 are schematic explanatory views illustrating removing operation of a sprocket of the magnet separator 101. It is necessary to periodically replace the sprocket since teeth abrade as the magnet separator is used. In addition, also in a case where a defect occurs, such as a case where some of the teeth of the sprocket are missing, replacement is necessary.

The magnet separator 101 of another embodiment includes the sprockets 18 illustrated in FIG. 4 as a driven sprocket and a driving sprocket. The main body 1 is the same as in the magnet separator 100 of the one embodiment. In addition, as illustrated in FIG. 6, the main body 1 includes a window 20a and a window 20b (as for the window 20a, refer to FIG. 3B) in side walls on the right and left. The window 20b is a through-hole formed in the left wall 1b of the main body 1. The window is provided at a position where the fixing members 19a, 19b, 19c, and 19d pass therethrough (a position seen from an outer side of the side wall) when the sprocket 18 is rotated. As the window 20b is provided, the fixing members 19a, 19b, 19c, and 19d can be removed or attached from an outer side of the main body 1 by using a tool. In addition, since the fixing members can be removed or attached from the outer side of the main body 1, it is not necessary to provide a space for performing work of removing or attaching the fixing members in a space between the side wall of the main body 1 and the rotary drum 2. Thus, there is also an effect in which the space is reduced and the main body 1 can be miniaturized. Two or more windows 20b (windows 20a) may be provided in one side wall.

Removing operation of the sprocket split body 18b will be described with reference to FIGS. 6 to 8. As illustrated in FIG. 6, first, the rotary drum 2 is rotated to dispose the fixing member 19d at a position of the window 20b. Then, a tool such as a driver is inserted from the window 20b to remove the fixing member 19d. Next, as illustrated in FIG. 7, the rotary drum 2 is rotated to dispose the fixing member 19c at the position of the window 20b, and the fixing member 19c is removed. Lastly, the sprocket split body 18b is taken out from an upper part of the main body 1 (FIG. 8), and the removing operation is terminated. It is sufficient that attaching operation is performed in reverse order of the removing operation.

As for the positions of the window 20a and the window 20b which are formed in both side walls of the main body 1, it is preferable that the fixing member on the other end side of the rotary drum 2 and the window 20b formed in the other side wall are at the same position when the fixing member on one end side of the rotary drum 2 and the window 20a formed in one side wall are at the same position. In the magnet separator 101 of another embodiment, the window 20a formed in one side wall and the window 20b formed in the other side wall are formed at the same position when seen from the rotation axis direction of the rotary drum 2 (refer to FIG. 3B). Accordingly, removing or attaching operation of the sprocket split bodies on both ends of the rotary drum 2 can be simultaneously performed.

In addition, it is preferable that the positions of the windows are positioned above the liquid surface of the liquid to be treated when operation of the magnet separator stops. Accordingly, when performing removing or attaching operation of the sprocket, it is not necessary to drain the liquid to be treated, and the sprocket can be replaced with simple work. In addition, since the leakage of the liquid to be treated from the windows can be prevented, it is possible to seal the windows with simple plugs that are easily removed from the windows. An example of the simple plug includes a grommet with membrane attached.

As described above, since the sprocket is configured by the plurality of sprocket split bodies, the sprocket can be easily replaced in a state where the rotary drum is mounted on the main body by replacing each of the sprocket split bodies in the magnet separator of the present invention. Further, in a case where it is not necessary to replace the whole sprocket, such as a case where some of the sprocket teeth are missing, only a missing part of the sprocket split body can be replaced.

In addition, it is difficult to handle a rotary drum having a high magnetic force since a high magnetic force is generated, and thereby careful lifting work is necessary. On the contrary, since the sprocket can be replaced in a state where the rotary drum is mounted on the main body in the magnet separator of the present invention, the present invention is more effective in the sprocket replacement work in the magnet separator including the rotary drum having a high magnetic force. When such an effect is considered, it is preferable to apply the magnet separator of the present invention to the magnet separator including the rotary drum having a magnetic force, more preferably to a magnet separator including a rotary drum having magnetic flux density of 0.5 teslas or more, and particularly preferably to a magnet separator including a rotary drum having magnetic flux density of 1 tesla or more.

The magnet separator of the present invention collects a magnetic body included in a liquid to be treated due to a magnetic force, and a high collection rate is realized regardless of an oily liquid or a water-soluble liquid. Examples of the liquid to be treated include a coolant liquid for a metal polishing machine of which a work material is a magnetic metal and a plating liquid for a device that executes plating on a steel plate.

In addition, the magnet separator of the present invention can be used insofar as operation of separating a magnetic body, such as a metal, out from a liquid is performed. The magnet separator may be used, for example, in collecting a trace metal from industrial waste and removing foreign matters, such as a bolt, from beverages or cooking oil.

It should be understood that the invention is not limited to the above-described embodiment, but may be modified into various forms on the basis of the spirit of the invention. Additionally, the modifications are included in the scope of the invention.

What is claimed is:

1. A magnet separator that removes a magnetic body from a liquid to be treated, the magnet separator comprising:
   a rotary drum in which a plurality of magnets are disposed;
   a main body that accommodates the rotary drum; and
   at least two sprockets that are fixed to the rotary drum and transmit a driving force,
   wherein each of the sprockets is formed by a plurality of sprocket split bodies having sprocket teeth,
   wherein the main body includes a window for removing or attaching a fixing member that fixes the sprocket split bodies to the rotary drum, and
   wherein the sprocket split bodies are removable from a part of the main body other than the window.

2. The magnet separator according to claim 1, wherein each of the sprocket split bodies is formed of a non-magnetic body.

3. The magnet separator according to claim 1, wherein the window is positioned above a liquid surface of the liquid to be treated when operation of the magnet separator stops.

4. The magnet separator according to claim 1, wherein the sprockets are fixed to each of one end side and an other end side of the rotary drum, and the window is formed in each of both side walls of the main body, and
   when the fixing member on the one end side of the rotary drum and the window formed in one side wall of the main body are at the same position, the fixing member on the other end side of the rotary drum and the window formed in an other side wall of the main body are at the same position.

5. The magnet separator according to claim 1, wherein the sprockets are fixed to each of one end side and an other end side of the rotary drum, and a fixing member of the sprocket on the one end side and a fixing member of the sprocket on the other end side are attached to be at the substantially same position when seen from a rotation axis direction of the rotary drum.

6. The magnet separator according to claim 1, wherein the sprocket split bodies are removable from an upper part of the main body.

7. The magnet separator according to claim 1, wherein the sprocket split bodies are removable from a gap formed between a side wall of the main body and an end portion of the rotary drum.

8. The magnet separator according to claim 1, wherein the fixing member is attachable to or removable from an outer side of the main body through the window.

9. The magnet separator according to claim 1, wherein the main body includes a pedestal for fixing a shaft of the rotary drum.

10. The magnet separator according to claim 9, wherein the window is positioned above the pedestal of the main body.

11. The magnet separator according to claim 9, wherein the fixing member is fixed at a position on a radially outer side of the pedestal such that the fixing member does not come into contact with the pedestal when the sprockets are rotated.

* * * * *